April 28, 1953 G. L. SCHIEMANN 2,636,527
MALE AND FEMALE "C" CLAMP COMBINATION
Filed May 16, 1950 4 Sheets-Sheet 2
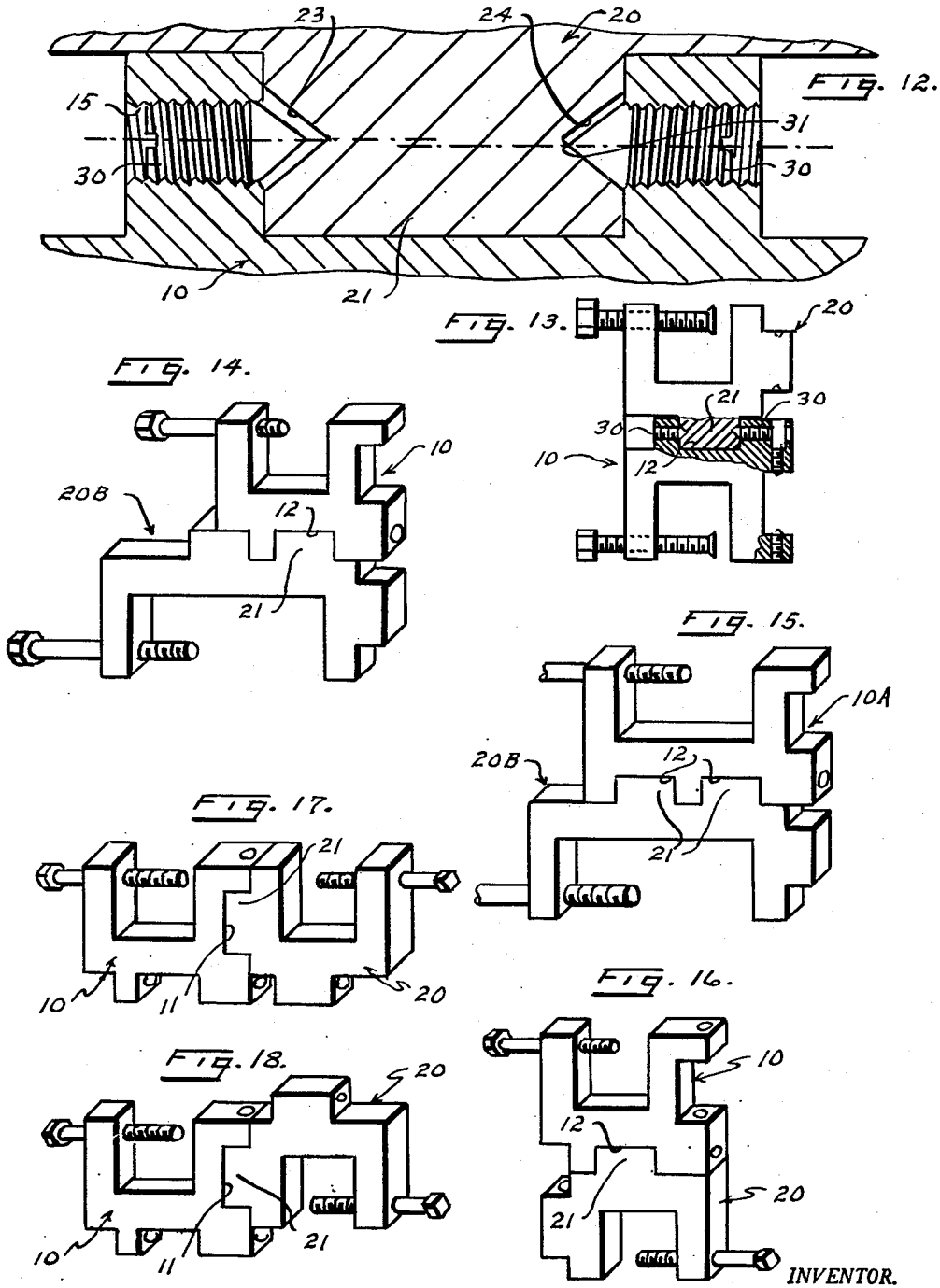
INVENTOR.
GEORGE LOUIS SCHIEMANN
BY Howard T. Jeandron
ATTORNEY April 28, 1953 G. L. SCHIEMANN 2,636,527
MALE AND FEMALE "C" CLAMP COMBINATION
Filed May 16, 1950 4 Sheets-Sheet 3
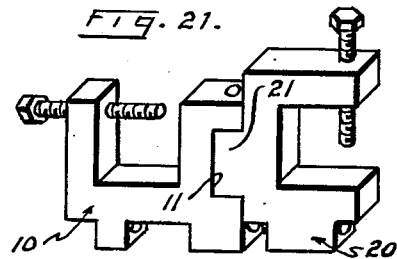
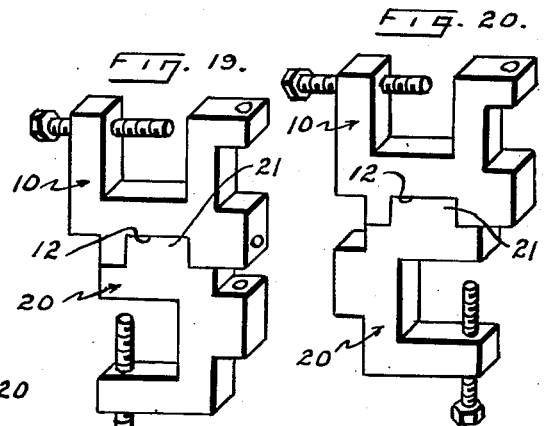
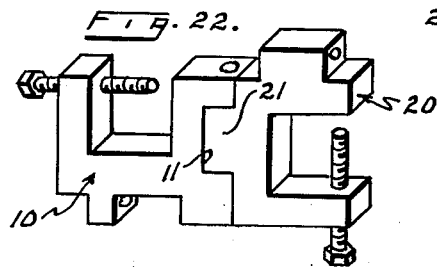
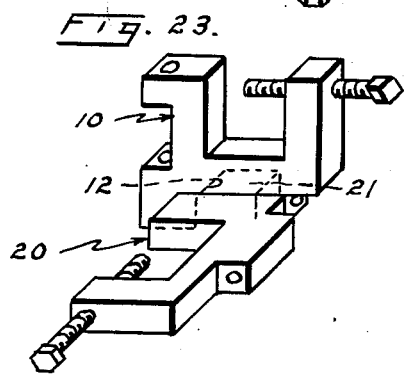
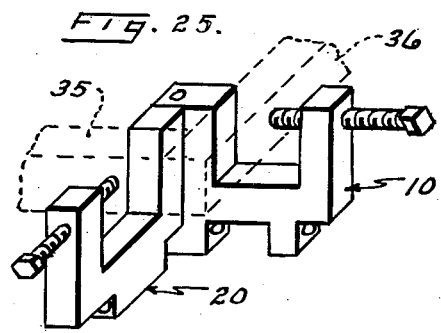
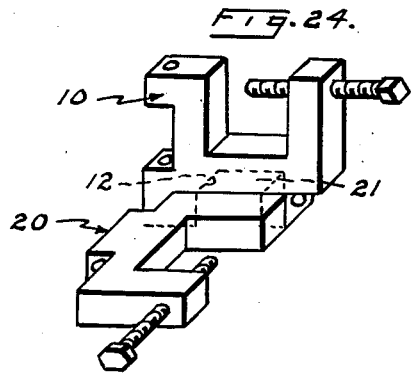
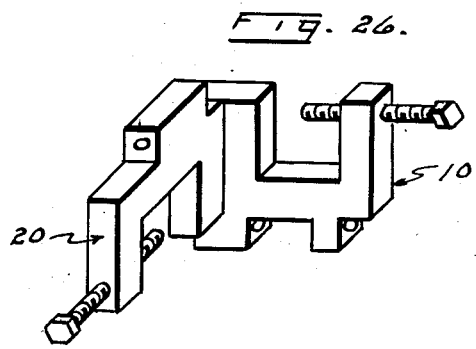
INVENTOR.
GEORGE LOUIS SCHIEMANN
BY
Howard T. Jeandron
ATTORNEY

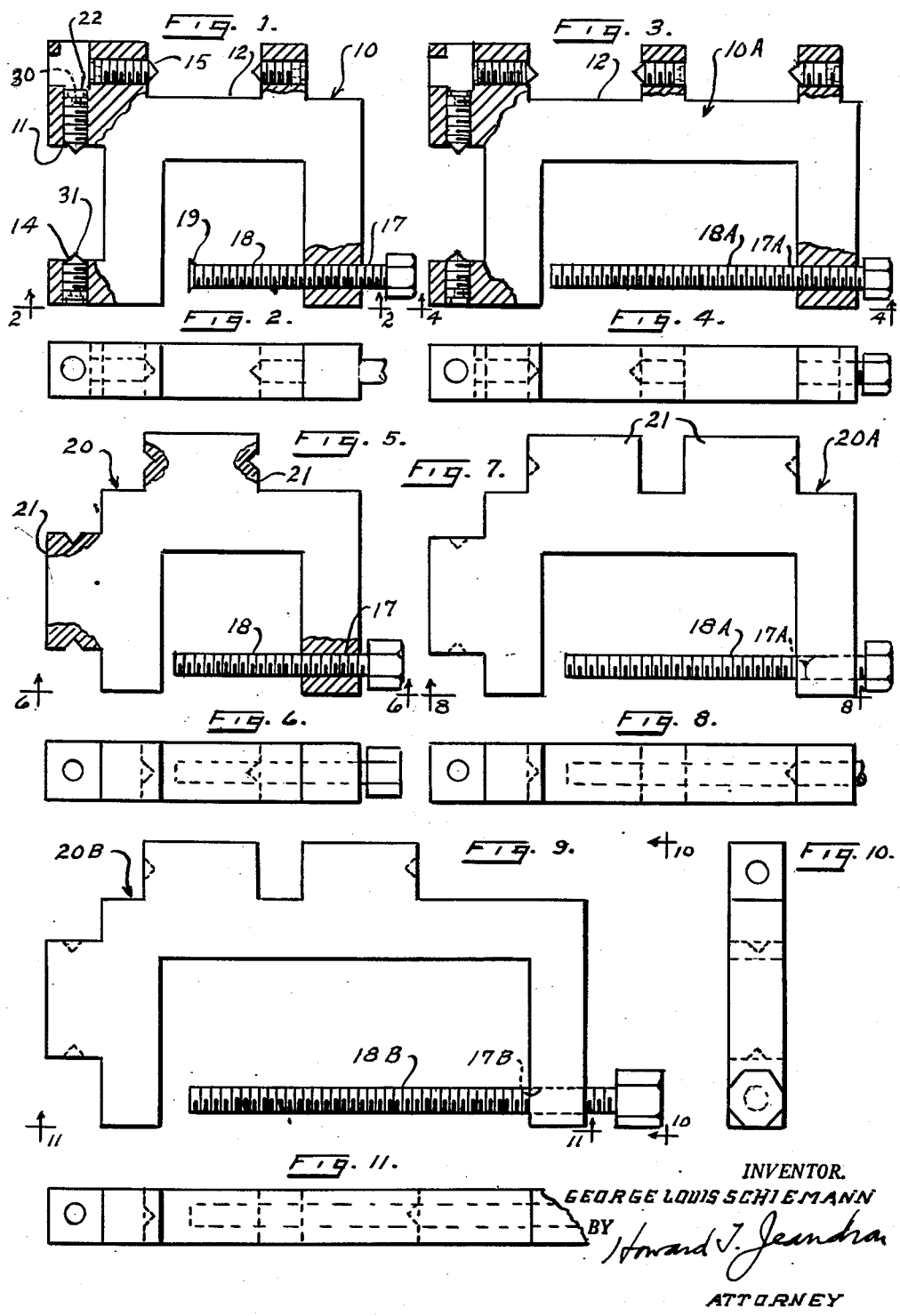

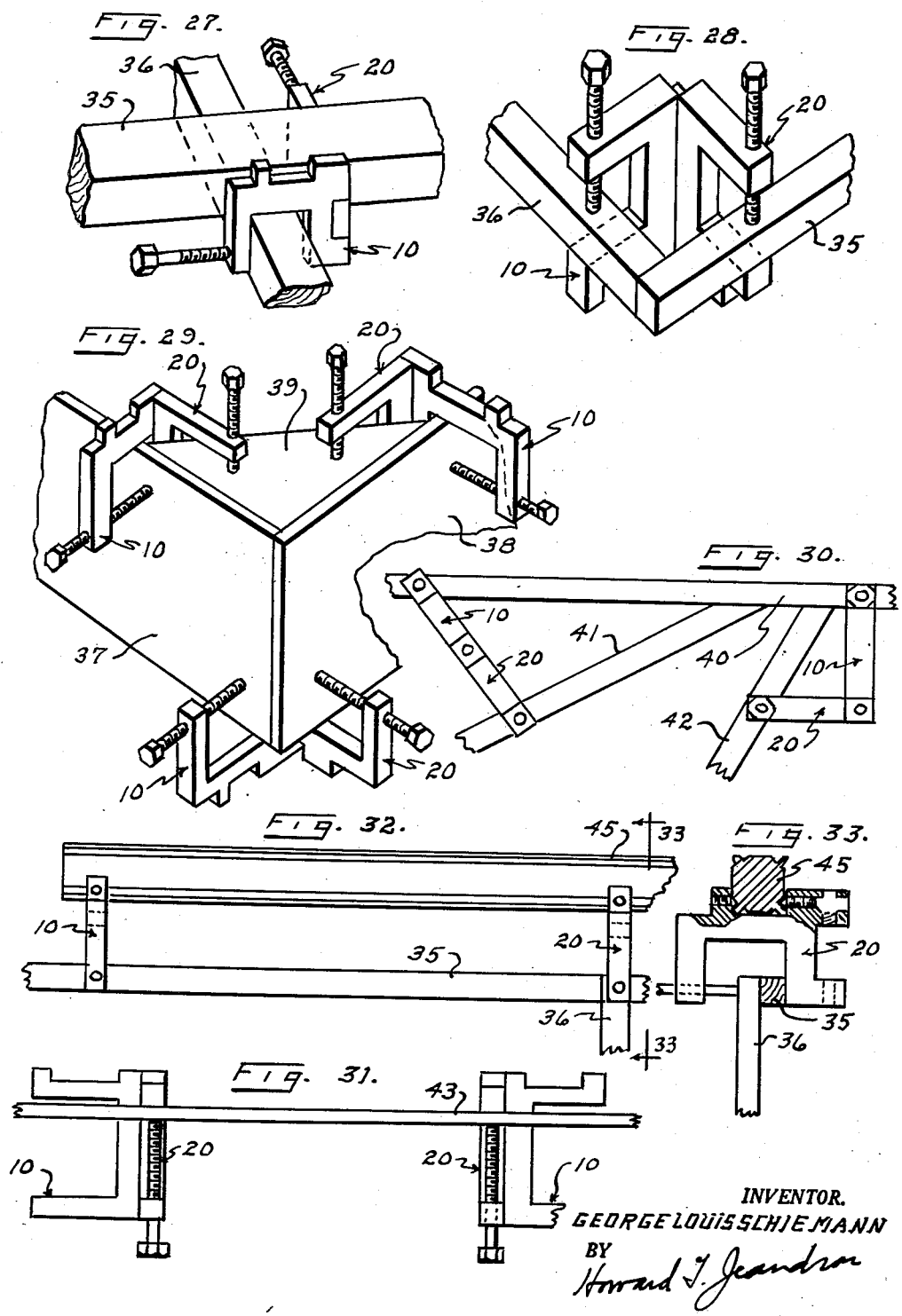

Patented Apr. 28, 1953

2,636,527

UNITED STATES PATENT OFFICE 2,636,527

MALE AND FEMALE C CLAMP COMBINATION

George Louis Schiemann, Belford, N. J., assignor of one-third to Henry Richard Schubel, Keansburg, one-third to Hugo Pietro Tomaini, Long Branch, and one-third to Robert George Schiemann, Belford, N. J.

Application May 16, 1950, Serial No. 162,330

3 Claims. (Cl. 144—304)

This invention relates to work holding C clamps and more particularly to a combination of two connected C clamps for holding work in various positions.

C clamps have been provided as work holding means and as a rule simply provide a gripping means to squeeze or retain two parts in a predetermined position for gluing, nailing or working upon the parts so held. However in model making in various homecraft projects, in the use of constructional toy sets, in the construction of dies and in the welding of small parts it is necessary to provide various clamps and the majority of clamps and C clamps and special forms that are available are comprised of a great many parts. Various operations are necessary to provide the means of retaining the elements that are to be worked on.

It is an object of this invention to provide a pair of C clamps that may be locked together in various positions to provide clamping means in two different planes.

A further object of this invention is to provide a pair of clamps in which two parts may be held in a predetermined position with relation to each other.

A further object of this invention is the provision of a pair of C clamps that may be joined and locked together in various relationships to provide clamping means for two parts in predetermined positions with relation to each other.

Another feature of this invention is to provide a plurality of C clamps of different size in which the various sized clamps are formed to key and lock together in different relationships to provide clamping means for parts of different size and to retain those parts in any predetermined relationship.

A still further object of this invention is to provide a male and female interlocking combination in which both the male and female members individually support a C clamp.

A still further object of this invention is to provide a pair of interlocking C clamps that may be produced as inexpensive castings yet provide strong and reliable clamping means.

Other objects of this invention may be apparent by reference to the accompanying detailed description and the drawings in which Fig. 1 illustrates the female element of the one inch C clamp combination, Fig. 2 is a bottom plan view taken on line 2—2 of Fig. 1, Fig. 3 is the female element of a two inch C clamp combination, Fig. 4 is a bottom plan view taken on line 4—4 of Fig. 3, Fig. 5 illustrates the male element of a one inch C clamp combination, Fig. 6 is a bottom plan view taken on line 6—6 of Fig. 5, Fig. 7 illustrates the male element of a two inch C clamp combination.

Fig. 8 is a bottom plan view taken on line 8—8 of Fig. 7,

Fig. 9 illustrates a male element of a three inch C clamp combination,

Fig. 10 is a side elevational view taken on line 10—10 of Fig. 9,

Fig. 11 is a bottom plan view taken on line 11—11 of Fig. 9,

Fig. 12 is a cross sectional detail of the male and female interlocking joint,

Fig. 13 is a front elevational view illustrating the combination of a one inch male and a one inch female C clamp when interlocked to form a pair of clamps, Fig. 14 is an isometric view which illustrates a combination of a one inch female C clamp element interlocked with a three inch male C clamp.

Fig. 15 is an isometric view illustrating a two inch female C clamp element interlocked with a three inch male C clamp element, Fig. 16 is an isometric view illustrating a pair of one inch male and female elements interlocked, Fig. 17 is an isometric view illustrating another variation of the interlocked position of the male and female elements of the C clamp combination, Fig. 18 is an isometric view illustrating a still further variation of the interlocked position of the male and female elements of the C clamp combination, Fig. 19 is an isometric view illustrating a still further variation of the interlocked position of the male and female elements of the C clamp combination, Fig. 20 is an isometric view illustrating a still further variation of the interlocked position of the male and female elements of the C clamp combination, Fig. 21 is an isometric view illustrating a still further variation of the interlocked position of the male and female elements of the C clamp combination, Fig. 22 is an isometric view illustrating a still further variation of the interlocked position of the male and female elements of the C clamp combination, Fig. 23 is an isometric view illustrating a still further variation of the interlocked position of the male and female elements of the C clamp combination, Fig. 24 is an isometric view illustrating a still further variation of the interlocked position of the male and female elements of the C clamp combination, Fig. 25 is an isometric view illustrating a still further variation of the interlocked position of the male and female elements of the C clamp combination, Fig. 26 is an isometric view illustrating a still further variation of the interlocked position of the male and female elements of the C clamp combination, Fig. 27 is a perspective view illustrating two structural elements retained at right angles to each other in an overlapping relationship by a male and female C clamp combination, Fig. 28 is a perspective view of two structural elements retained in an abutting relationship and positioned at right angles to each other and retained in this relationship by a male and female C clamp combination, Fig. 29 is a perspective view of a pair of panels retained in an abutting relationship at right angles to each other and in which a corner block is retained between the panels and the structure is supported by combinations of male and female C clamp elements, Fig. 30 is a plan view illustrating the use of the interlocked C clamps to retain two structural elements in any angular relationship to each other, Fig. 31 is a plan view of a pair of C clamp combinations that are used to support a panel at either end thereof and provide a supporting base, Fig. 32 illustrates a jig fixture in which the C clamp combinations are utilized to retain work in a predetermined position, and Fig. 33 is a cross sectional view taken on line 33—33 of Fig. 32.

Referring to the drawings in which Fig. 1 illustrates the female element 10 of the C clamp combination, element 10 is formed generally in the shape of a C. The normal base portion of the C is provided with a rectangular cutout portion 11 and similarly the upright end of the C is provided with a rectangular cutout portion 12 of the same dimensions as portion 11. A bore 14 is provided in the base portion of the C and aligned with the central axis of the cutout portion 11. Similarly a bore 15 is provided in the upright end of the C and aligned with the central axis of the cutout portion 12. A third bore 17 is provided through the end of the top element of the C and the bore 17 is threaded to receive an extended bolt 18. The bolt 18 may or may not be provided with an enlarged rotatable end element 19. Although we have described the clamp 10 as generally C-shaped it is to be understood that the C shape is square in form. It is necessary to keep the square form so that the base of the C is at 90° to the upright leg and the upright leg is at 90° to the top. Thus we establish a three branch element with three outer faces that are kept square with relation to each other. With an element 10 shaped in this manner it is possible to construct the clamp and its joints as illustrated to combine this clamp with an interlocking clamp in an aligned position or in any position at 90° to this clamp. The bores 14 and 15 are threaded to receive threaded plug elements 30. The plugs 30 are formed with a point 31 at one end thereof and are provided with a socket 22 at the other end thereof. The socket 22 is provided so that a wrench (not shown) may be inserted into the socket to rotate said plug into its proper adjusted position. It will be noted that the plugs 30 are mounted in the bores 14 and 15 in an opposed relationship so that the pointed end 31 of each plug faces the end 31 of the opposed plug. This provides an adjustable point support for the male element that is to be fitted into either opening 11 or 12. It is to be noted that the bolt 18 is threadably secured in the bore 17 and when the bolt 18 is released to a maximum degree the clamp is provided to grip a one inch device or element and of course bolt 18 when threaded in the opposite direction will grip or retain any elements less than one inch. Fig. 3 illustrates a similar structure to that illustrated in Fig. 1 except that the clamp 10A is double the length to permit grasping and holding work of two inches or less and in addition clamp 10A on the upright leg element of the C due to its greater length is provided with two cutout portions 12 of equal size. It is to be noted that bolt 18A is double the length of bolt 18 of Fig. 1 and when bolt 18A is released to a maximum degree the clamp is provided to grip a two inch device or element and of course bolt 18A when threaded in the opposite direction will grip or retain any elements less than two inches. Referring to Fig. 5 there is illustrated the male element 20 of the one inch C clamp combination. Element 20 is similarly shaped as a C and in its base portion it is provided with a rectangular shaped projection 21 of approximately the dimensions of the rectangular cutout portions 11 and 12 of Fig. 1 so that the projection 21 will fit exactly within the opening of the cutout portion 11 or 12. Similarly the upright leg portion of the C clamp 20 is provided with a rectangular shaped projection 21 of the same dimensions to fit into the opening of the cutout portion 11 or 12 of Fig. 1. The end of the top of the C is provided with a threaded bore 17 similar to that provided in Fig. 1 and a bolt 18 is threadably secured in the bore 17 in the same manner as illustrated in Fig. 1 and the bolt 18 will perform exactly the same as the bolt 18 of Fig. 1 to similarly hold a one inch element or less. Referring to Fig. 7 there is illustrated a male element 20A of a two inch C clamp which is similar to that illustrated in Fig. 5 but double the length and in addition the upright leg of the C element will be provided with two projections 21 of similar size and spaced to align with the cutout portions 12 as illustrated in Fig. 3. It is to be noted that the bolt 18A is double the length of bolt 18 of Fig. 5 and the bolt 18A will perform exactly the same as the bolt 18A of Fig. 3 to similarly hold a two inch element or less. Fig. 9 illustrates a male element 20B of a three inch C clamp which is similar to that illustrated in Fig. 7 but triple the length of the clamp 20 illustrated in Fig. 5. It is to be noted that a bolt 18B is threadably secured in the bore 17B and the bolt 18B is triple the length of the bolt 18 of Fig. 5. When bolt 18B is released to a maximum degree the clamp is provided to grip a three inch device or element and of course bolt 18B when threaded in the opposite direction will grip or retain any elements less than three inches. Referring to Fig. 12 there is illustrated the interlocking joint between the male element 20 and the female element 10 of the C clamp combination. It is to be noted that the portion 21 of the male element 20 is provided with two cone shaped openings 23 and 24 on either end of the rectangular portion 21. The cone shaped openings 23 and 24 are positioned on the central axis of portion 21. If the bore 14 or 15 of the female element 10 was retained on the same axis and the plugs 30 threadably adjusted to permit the pointed end 31 to seat in the cone shaped openings 23 and 24 we would provide a hinged joint. Therefore in this device we stagger the bore 14 or 15 as the case may be with a central axis slightly offset as illustrated in Fig. 12 and by so doing when the plugs 30 are threadably adjusted to grip the cone shaped openings 23 and 24 it is apparent that one plug may seat in the opening while the other plug will bind against one side of the cone or bore; plugs 30 will bind in opposed relation so that the interlocked joint no longer provides a loose pivotal center but rather provides a pair of binding pins that jam the interlocked joint into a solid binding gripping relationship.

Fig. 13 illustrates a male element 20 and a female C element 10 interlocked in a tight binding relationship as decribed with relation to Fig. 12, that is the rectangular portion 21 connected to the leg of the C element 20 is positioned in the cutout portion 12 of the leg of the C element 10 and according to Fig. 12 the C clamps are locked in this position by means of the plugs 30. The elements illustrated in Fig. 13 are positioned in the same plane but in a back to back relationship. Fig. 14 illustrates one of the combinations of different size male and female C clamp elements. In this figure there is provided a one inch female C element 10 that is interlocked with a three inch male C element 20B. The clamps are so positioned that the rectangular portion 21 of element 20B is fitted into the cutout portion 12 of the element 10 and as in Fig. 12 by means of the plugs 30 (not shown) the two elements are retained in a tight binding relationship. This illustrates one of the possible combinations of different size elements. Referring to Fig. 15 there is illustrated still another combination of different size C elements. In this figure there is combined a two inch female C element 10A interlocked with a three inch male C element 20B. The clamps are so positioned that the rectangular portions 21 of element 20B are fitted into the cutout portions 12 of the element 10 and as in Fig. 12 by means of the plugs 30 (not shown) the two elements are retained in a tight binding relationship. Fig. 16 illustrates a pair of interlocked C elements comprised of a female element 10 and a male element 20. The clamps are so positioned that the rectangular portion 21 of element 20 is fitted into the cutout portion 12 of the element 10 and as in Fig. 12 by means of the plugs 30 (not shown) the two elements are retained in a tight binding relationship. In this instance they are combined in a similar relation to that shown in Fig. 13 except for the fact that element 20 has been rotated 180° to position the C clamp in an opposite relation to the C clamp of element 10. Fig. 17 illustrates a pair of interlocked C clamp elements comprised of a female element 10 and a male element 20. The clamps are so positioned that the rectangular portion 21 of element 20 is fitted into the cutout portion 11 of the element 10 and as in Fig. 12 by means of the plugs 30 (not shown) the two elements are retained in a tight binding relationship. Fig. 18 illustrates a pair of interlocked C clamp elements comprised of a female element 10 and a male element 20. The clamps are so positioned that the rectangular portion 21 of element 20 is fitted into the cutout portion 11 of the element 10 and as in Fig. 12 by means of the plugs 30 (not shown) the two elements are retained in a tight binding relationship. In this instance they are combined the same as that shown in Fig. 17 except for the fact that element 20 has been rotated 180° to position the C clamp in an opposite relation to the C clamp shown in Fig. 17. Fig. 19 illustrates a pair of interlocked C clamp elements comprised of a female element 10 and a male element 20. The clamps are so positioned that the rectangular portion 21 of element 20 is fitted into the cutout portion 12 of the element 10 and as in Fig. 12 by means of the plugs 30 (not shown) the two elements are retained in a tight binding relationship. In this instance they are combined so that the C clamps operate at right angles to each other but in the same plane. Fig. 20 illustrates a pair of interlocked C clamp elements comprised of a female element 10 and a male element 20. The clamps are so positioned that the rectangular portion 21 of element 20 is fitted into the cutout portion 12 of the element 10 and as in Fig. 12 by means of the plugs 30 (not shown) the two elements are retained in a tight binding relationship. In this instance they are combined the same as that shown in Fig. 19 except for the fact that element 20 has been rotated 180° to position the C clamp in an opposite relation to the C clamp shown in Fig. 19. Fig. 21 illustrates a pair of interlocked C clamp elements comprised of a female element 10 and a male element 20. The clamps are so positioned that the rectangular portion 21 of element 20 is fitted into the cutout portion 11 of the element 10. In this instance they are combined so that the C clamps operate at right angles to each other but in the same plane. Fig. 22 illustrates a pair of interlocked C clamp elements comprised of a female element 10 and a male element 20. The clamps are so positioned that the rectangular portion 21 of element 20 is fitted into the cutout portion 11 of the element 10. In this instance they are combined the same as that shown in Fig. 21 except for the fact that element 20 has been rotated 180° to position the C clamp in an opposite relation to the C clamp shown in Fig. 21. Fig. 23 illustrates a pair of interlocked C clamp elements comprised of a female element 10 and a male element 20. The clamps are so positioned that the rectangular portion 21 of element 20 is fitted into the cutout portion 12 of the element 10. In this instance they are combined so that the C clamps operate at right angles to each other and the C clamp elements 10 and 20 are likewise positioned in two planes at right angles to each other. Fig. 24 illustrates a pair of interlocked C clamp elements comprised of a female element 10 and a male element 20. The clamps are so positioned that the rectangular portion 21 of element 20 is fitted into the cutout portion 12 of the element 10. In this instance they are combined the same as that shown in Fig. 23 except for the fact that element 20 has been rotated 180° to position the C clamp in an opposite relation to the C clamp 20 shown in Fig. 23. Fig. 25 illustrates a pair of interlocked C clamp elements comprised of a female element 10 and a male element 20. The clamps are so positioned that the rectangular portion 21 (not shown) of element 20 is fitted into the cutout portion 11 (not shown) of the element 10. In this instance they are combined so that the C clamps operate at right angles to each other.

The C clamp elements 10 and 20 are likewise positioned in two planes at right angles to each other similar to the clamps illustrated in Fig. 23 except that the element 10 of Fig. 23 has been rotated 90°. Fig. 26 illustrates a pair of interlocked C clamp elements comprised of a female element 10 and a male element 20. The clamps are so positioned that the rectangular portion 21 (not shown) of element 20 is fitted into the cutout portion 11 (not shown) of the element 10. In this instance they are combined the same as that shown in Fig. 25 except for the fact that element 20 has been rotated 180° to position the C clamp in an opposite relation to the C clamp 20 shown in Fig. 25.

Having described the C clamps in their various combinations we may see the application of the clamps to various work examples by reference to the following figures:

Fig. 25 illustrates the clamps 10 and 20 as utilized to retain a pair of structural elements 35 and 36 (illustrated in dotted lines) in an abutting relationship in which the members 35 and 36 are retained at 90° to each other, clamp 20 retaining element 35 while clamp 10 retains element 36. In such an application of the clamp, the elements may be held in this relation for gluing as in model making or for welding (if the elements are of metal) or for any other work operation where it is necessary to retain the elements in this relationship for further work.

Fig. 27 illustrates a pair of interlocked clamps 10 and 20 combined in the form illustrated in Fig. 26. In this form a pair of structural elements 35 and 36 may be held in overlapping relationship at 90° to each other and as in the previous embodiment the structural elements may be further worked on while held in this relationship.

Fig. 28 illustrates a pair of interlocked C clamps 10 and 20 positioned in a similar relationship to that illustrated in Fig. 13 except that instead of the clamps being in alignment back to back, the clamps are pivotally moved about the axis of the plugs 30 to lay at 90° to each other and interlocked in this position. With the clamps in the position illustrated in Fig. 28 they provide a pair of holding means to retain a pair of structural members 35 and 36 at 90° to each other as illustrated.

Fig. 29 illustrates the use of a plurality of interlocked C clamps. In this embodiment there are provided a pair of panels 37 and 38 and a corner block 39. To retain the panels 37 and 38 as well as the corner block 39 in the position illustrated, it is necessary to use three sets of clamps. The first set of clamps 10 and 20 may be installed at the lower edge of the panels 37 and 38 and this set of clamps will be combined in a form similar to that illustrated in Fig. 25. The second set of clamps 10 and 20 are combined in a similar relationship to that illustrated in Fig. 23. In this instance clamp 10 provides the support for the panel 37 while clamp 20 provides the support for the corner block 39. Similarly the third set of clamps 10 and 20 are combined in a similar relationship to that illustrated in Fig. 23. In this instance clamp 10 provides the support for the panel 38 while clamp 20 provides the support for the corner block 39. Thus with the three sets of clamps affixed in the relationship described the panels 37 and 38 and the corner block 39 will be held in a rigid relationship as illustrated and of course while retained in this relationship permit further work operations on the structure in the form in which it is retained by the clamps.

Fig. 30 illustrates the use of a pair of C clamps in a similar application, that is, with a beam or strut 40 it may be necessary to retain an abutting structural element 41 at approximately 30° to element 40. One manner of retaining the elements in this relationship is to clamp both elements with a pair of interlocked clamps 10 and 20 that are combined in a similar relationship to that illustrated in Fig. 13. Or, as in another instance in which a structural element 42 is to be positioned at 60° to element 40, a pair of interlocked C clamps 10 and 20 similar to those shown in Fig. 28 may be utilized to clamp elements 40 and 42 retaining them in the angular relationship predetermined.

Fig. 31 illustrates a further embodiment of the use of a pair of interlocked C clamps for supporting a panel 43. In this instance the base member may be the clamp 10 of each combination while the upright clamp would be element 20. In this instance the clamps are combined as illustrated in Fig. 13 except that clamp 20 is pivotally moved to a position at 90° with relation to clamp 10. It is apparent in this figure that the lower base clamp 10 does not require the clamping bolt 18 as the element 10 is simply the base support. However if the same embodiment illustrated is to be connected to an upright member the clamping bolt will be necessary.

Fig. 32 illustrates a further embodiment in which a plurality of clamps 10 may be used separately, that is, if as in this instance a jig is to be formed using a bar element 45 (Figs. 32 and 33) as shown in cross section in Fig. 33, the clamp 10 is first affixed to the bar 45 by means of the plugs 30 so that the element 10 will be in a locked relationship with the bar 45. The clamp 10 may then be utilized to retain a pair of structural elements 35 and 36 in an overlapped relationship as illustrated in Figs. 32 and 33. Similarly the clamp 10 may be affixed to the jig bar 45 and the clamp 10 utilized to clamp the structural element 35 at an opposite end thereof. Although we have shown a single form of jig fixture it is apparent that the clamps 10 used singly or in pairs may be mounted to the jig bar 45 in any of four positions, namely, the position illustrated in Fig. 33, the opposite side of bar 45 or at right angles to the position illustrated on either the left or right hand side of the bar 45. It is apparent that bar 45 may be formed in any predetermined shape and in such predetermined form the clamps 10 may be utilized as the holding or clamping means to retain elements such as 35 and 36 in a plurality of positions as desired. In addition to using the clamps 10 and 20 in their interlocked relationship and affixing the clamps to a pair of jig bars 45 the number of positions in which the clamps may be provided is unlimited and with this type of jig fixture any holding problem may be attained.

Although we have shown a pair of C clamps comprised of a male and female member they may be interlocked in various combinations. It is apparent that the general C-shaped form should not be construed as the limited form as the clamp may vary from this general contour without departing from the spirit of this invention. It is to be further understood that although there are illustrated three sizes with the same interchangeable interlocking feature the clamps may be manufactured in a great many different sizes and may or may not retain the interlocking features without departing from the spirit of this invention. It is also to be understood that although there are illustrated a plurality of applications of the clamp, the applications shown are only by way of example. In addition there are an unlimited number of combinations that may be utilized as holding means for the further use of the interlocked clamps and further although throughout this application we have referred to the clamps alone or interlocked in pairs, it is to be understood that the clamps may be combined in an interlocked relationship of three or more clamps where the holding operation requires a plurality of holding planes and in such instance a great many combinations may be attained without departing from the spirit of this invention. In addition there may be a great many combinations of the clamps either singly or in pairs as applied to jig fixtures similar to that illustrated in Figs. 32 and 33 without departing from the spirit of this invention and this invention shall be limited only by the appended claims.

What is claimed is:

1. In a pair of C clamps that may be interlocked, a female clamp which includes a generally square shaped form provided with three branches, two adjacent branches provided with cutout portions on their outer edges, the opposing walls of said cutout portions having locking pins threaded therein, said third branch provided with a threadably secured extended bolt to provide a clamping action between the bolt and the opposite branch of the C clamp, and a male clamp which includes a generally square shaped form provided with three branches, the outer edges of two adjacent branches being provided with projecting portions which are generally shaped to fit into the cutout portions in the female clamp, cone shaped openings on each side of said projections in an opposed relationship and in alignment with the threaded locking pins of the female clamp, said third branch provided with a threadably secured extended bolt to provide a clamping action between the bolt and the opposite branch of the C clamp.

2. In a pair of C clamps that may be interlocked, a female clamp which includes a generally square shaped form provided with three branches, two adjacent branches provided with cutout portions on their outer edges, the opposing walls of said cutout portions having locking pins threaded therein, said third branch provided with a threadably secured extended bolt to provide a clamping action between the bolt and the opposite branch of the C clamp and a male clamp which includes a generally square shaped form provided with three branches, the outer edges of two adjacent branches being provided with projecting portions which are generally shaped to fit into the cutout portions in the female clamp, cone shaped openings on each side of said projections in an opposed relationship and one opening in alignment with the locking pins of the female clamp while the other opening is slightly off-set from the aligned axis of the locking pins, said third branch provided with a threadably secured extended bolt to provide a clamping action between the bolt and the opposite side of the C clamp.

3. In a jig fixture a plurality of C clamps, said C clamps are in a generally square shaped form provided with three branches, two adjacent branches provided with cutout portions on the outer edges, the opposing walls of said cutout portions having locking pins threaded therein, said third branch provided with a threadably secured extended bolt to provide a clamping action between the bolt and the opposite side of the C clamp, a generally four sided bar element dimensioned to fit slideably within the cutout portions of the C clamps, each side of said bar element being provided with a pair of longitudinally extending grooves, said grooves being parallel to, and adjacent the edges, of the bar and in alignment with the locking pins in the cutout portions of the C clamps, whereby a plurality of C clamps can be adjustably mounted on said bar element with the locking pins of the C clamps engaged in grooves on opposite sides of said bar elements.

GEORGE LOUIS SCHIEMANN.

References Cited in the file of this patent

UNITED STATES PATENTS

| Number | Name | Date |
|---|---|---|
| 252,779 | Kraiss | Jan. 24, 1882 |
| 1,352,647 | Benton | Sept. 14, 1920 |
| 1,386,318 | Cowan | Aug. 2, 1921 |
| 1,875,761 | Power | Sept. 6, 1932 |
| 1,973,238 | Walter | Sept. 11, 1934 |
| 1,987,826 | Heumann | Jan. 15, 1935 |
| 2,324,803 | Snyder | July 20, 1943 |